US012798456B2

(12) United States Patent
Greenwood

(10) Patent No.: US 12,798,456 B2
(45) Date of Patent: Nov. 17, 2026

(54) FLEXIBLE HEATER AND METHOD OF INTEGRATION

(71) Applicant: GENTHERM GMBH, Odelzhausen (DE)

(72) Inventor: Shane Kyle Greenwood, Northville, MI (US)

(73) Assignee: Gentherm GmbH, Odelzhausen (DE)

( * ) Notice: Subject to any disclaimer, the term of this patent is extended or adjusted under 35 U.S.C. 154(b) by 32 days.

(21) Appl. No.: 19/021,365

(22) Filed: Jan. 15, 2025

(65) Prior Publication Data

US 2025/0153618 A1 May 15, 2025

Related U.S. Application Data

(63) Continuation of application No. 18/441,141, filed on Feb. 14, 2024, now Pat. No. 12,227,115, which is a continuation of application No. 17/752,953, filed on May 25, 2022, now Pat. No. 11,945,348, which is a continuation of application No. 16/338,767, filed as application No. PCT/US2017/058453 on Oct. 26, 2017, now Pat. No. 11,370,337.

(60) Provisional application No. 62/416,110, filed on Nov. 1, 2016.

(51) Int. Cl.
*B60N 2/56* (2006.01)
*H05B 3/34* (2006.01)

(52) U.S. Cl.
CPC ......... *B60N 2/5685* (2013.01); *B60N 2/5642* (2013.01); *H05B 3/34* (2013.01); *H05B 2203/003* (2013.01); *H05B 2203/029* (2013.01)

(58) Field of Classification Search
CPC ........... H05B 3/34; B60N 2/5685; B60N 2/56
USPC ........................... 297/180.11, 180.12, 180.14
See application file for complete search history.

(56) References Cited

U.S. PATENT DOCUMENTS

| | | | |
|---|---|---|---|
| 4,044,221 | A | 8/1977 | Kuhn |
| 4,335,725 | A | 6/1982 | Geldmacher |
| 4,533,821 | A | 8/1985 | Sato |
| 4,661,689 | A | 4/1987 | Harrison |
| 4,777,351 | A | 10/1988 | Batliwalla et al. |
| 4,868,898 | A | 9/1989 | Seto |
| 4,931,627 | A | 6/1990 | Watts |
| 4,964,674 | A | 10/1990 | Altmann et al. |

(Continued)

FOREIGN PATENT DOCUMENTS

| | | | |
|---|---|---|---|
| DE | 102009008421 | A1 | 10/2009 |
| DE | 112006000116 | B4 | 2/2011 |

OTHER PUBLICATIONS

International Search Report, Application No. PCT/US2017/058453, mailed Feb. 2, 2018, pp. 1-13.

(Continued)

*Primary Examiner* — Shin H Kim
(74) *Attorney, Agent, or Firm* — Miller Johnson

(57) ABSTRACT

A climate controlled system comprising: a movable member disposed in a recess of a cushion and forming part of an occupant support surface with the cushion; a heater overlaying the cushion and the movable member, the heater including: a flexible substrate, a heating element, and an adhesive layer, wherein the flexible substrate includes adhesive on opposing longitudinal edge regions and the adhesive directly or indirectly connects the heater to the cushion; and wherein the adhesive layer anchors the heater as the flexible substrate stretches or moves with the movable member as the movable member moves.

19 Claims, 7 Drawing Sheets

(56) References Cited

U.S. PATENT DOCUMENTS

| | | | |
|---|---|---|---|
| 5,197,595 | A | 3/1993 | Coultas |
| 5,422,462 | A | 6/1995 | Kishimoto |
| 5,432,322 | A | 7/1995 | Ingram |
| 5,451,747 | A | 9/1995 | Sullivan et al. |
| 5,477,033 | A | 12/1995 | Bergholtz |
| 5,516,189 | A | 5/1996 | Ligeras |
| 5,543,601 | A | 8/1996 | Bartrug et al. |
| 5,626,021 | A | 5/1997 | Karunasiri et al. |
| 5,643,480 | A | 7/1997 | Gustavsson et al. |
| 5,679,277 | A | 10/1997 | Niibe et al. |
| 5,702,565 | A | 12/1997 | Wu et al. |
| 5,716,536 | A | 2/1998 | Yokoto et al. |
| 5,796,044 | A | 8/1998 | Cobian et al. |
| 5,800,483 | A | 9/1998 | Vought |
| 5,824,996 | A | 10/1998 | Kochman et al. |
| 5,851,588 | A | 12/1998 | Uthoff, Jr. |
| 5,861,610 | A | 1/1999 | Weiss |
| 6,150,642 | A | 11/2000 | Weiss et al. |
| 6,164,719 | A | 12/2000 | Rauh |
| 6,172,344 | B1 | 1/2001 | Gordon et al. |
| 6,619,736 | B2 | 9/2003 | Stowe et al. |
| 6,629,724 | B2 | 10/2003 | Ekern et al. |
| 6,664,512 | B2 | 12/2003 | Horey et al. |
| 6,664,518 | B2 | 12/2003 | Fristedt et al. |
| 6,676,207 | B2 | 1/2004 | Rauh et al. |
| 6,686,562 | B1 | 2/2004 | Weiss et al. |
| 6,710,303 | B1 | 3/2004 | Lorenzen |
| 6,838,647 | B2 | 1/2005 | Nagele |
| 7,223,948 | B2 | 5/2007 | Howick et al. |
| 7,285,748 | B2 | 10/2007 | Nelson et al. |
| 7,338,117 | B2 | 3/2008 | Iqbal et al. |
| 7,356,912 | B2 | 4/2008 | Iqbal et al. |
| 7,560,670 | B2 | 7/2009 | Lorenzen et al. |
| 7,862,113 | B2 | 1/2011 | Knoll |
| 2005/0173950 | A1 | 8/2005 | Bajic et al. |
| 2005/0264086 | A1 | 12/2005 | Lofy et al. |
| 2007/0176471 | A1 | 8/2007 | Knoll |
| 2009/0033130 | A1 | 2/2009 | Marquette et al. |
| 2013/0020852 | A1 | 1/2013 | Corcoran |
| 2013/0249258 | A1 | 9/2013 | Kortwig |
| 2014/0097651 | A1 | 4/2014 | Fortune et al. |

OTHER PUBLICATIONS

German Office Action dated Jun. 20, 2022, for German Application 112017005518.0.

Examination Report issued by the German Patent and Trademark Office on Aug. 4, 2025, relating to German Divisional application 112017008485.7.

FLEXIBLE HEATER AND METHOD OF INTEGRATION

FIELD

The present teachings relate generally to heaters and more particularly to heaters for use in seats, arm rest, or other locations of automotive vehicles that an occupant contacts, and preferably a heater that is integrated into an article that changes shape and/or size during use and the heater is movable as the article changes shape and/or size.

BACKGROUND

For many years, industry has been concerned with designing improved heaters for articles of manufacture such as seats, mirrors, handles of furniture, automotive vehicles, or other transportation vehicles. Examples of such heaters are disclosed in U.S. Pat. Nos. 7,560,670; 7,285,748; 7,223,948; 6,838,647; 6,710,303; 6,150,642; 5,451,747; 4,931,627; and 4,777,351 and U.S. Patent Application Publication No. 2010/0289303 all of which are expressly incorporated herein by reference for all purposes. These heaters extend over a structure that has flexibility, but the structure remains generally a same size. Moreover, these heaters may be connected to the structure (e.g., seat) over a substantial area so that the heater moves with the structure. For example, when an occupant sits on a seat, the seat and heater move in unison.

It would be attractive to have a heater that permits a structure (e.g., seat, arm rest, or other occupant contact region) to change shape. What is needed is a heater that is connected to a structure and permits the structure or a component within the structure to move without damaging the heater. It would be attractive to have a flexible heater that expands and contracts with a change in shape of the structure. What is needed is a heater with a wire that has a pattern which allows the substrate of the heater to move without being restricted by the wire. The substrate and the wires may be configured to move as portions of a structure or a movable members move.

SUMMARY

The present teachings provide: a climate controlled system comprising: a movable member disposed in a recess of a cushion and forming part of an occupant support surface with the cushion; a heater overlaying the cushion and the movable member, the heater including: a flexible substrate, a heating element, and an adhesive layer, wherein the flexible substrate includes adhesive on opposing longitudinal edge regions and the adhesive directly or indirectly connects the heater to the cushion; and wherein the adhesive layer anchors the heater as the flexible substrate stretches or moves with the movable member as the movable member moves.

The present teachings provide: a climate controlled system comprising: a movable member disposed in a recess of a cushion and forming part of an occupant support surface with the cushion; a heater overlaying the cushion and the movable member, the heater including: a flexible substrate, a heating element, and an adhesive layer, wherein the flexible substrate includes adhesive on opposing longitudinal edge regions and the adhesive connects to a sidewall of a trench located on opposing sides of the cushion, the sidewall extending in a direction away from an occupant; and wherein the adhesive layer anchors the heater in the trench and the flexible substrate stretches or moves relative to the movable member during movement of the movable member.

The present teachings provide: a climate controlled system comprising: a movable member disposed in a recess of a cushion and forming part of an occupant support surface with the cushion; a heater overlaying the cushion and the movable member, the heater including: a flexible substrate, an adhesive layer, and a heating element comprising: a first leg extending along a first side of the movable member from a first end to a second end, a second leg extending along a second side of the movable member from the first end to the second end, and a connection leg connecting the first leg and second leg at one of the first and second ends, wherein the first leg and the second leg each extend from an area of the occupant support surface outside the movable member towards a center of the movable member; and wherein the adhesive layer anchors the heater and the flexible substrate stretches or moves relative to the movable member during movement of the movable member.

The present teachings provide: a climate controlled system comprising: a movable member disposed in a recess of a cushion and forming part of an occupant support surface with the cushion; a heater overlaying the cushion and the movable member, the heater including: a flexible substrate, a heating element; and an adhesive layer including a slit, wherein the adhesive layer anchors the flexible substrate stretches and/or the slit in the flexible substrate separates and moves relative to the movable member during movement of the movable member so that the slit accommodates movement of the movable member.

The present teachings provide a heater that permits a structure (e.g., seat, arm rest, or other occupant contact region) to change shape. The present teachings provide a heater that is connected to a structure and permits the structure or a component within the structure to move without damaging the heater. The present teachings provide a flexible heater that expands and contracts with a change in shape of the structure. The present teachings provide a heater with a wire that has a pattern which allows the substrate of the heater to move without being restricted by the wire. The present teachings provide wires that are configured to move as portions of a structure or a movable members move.

DETAILED DESCRIPTION

Figure 1:
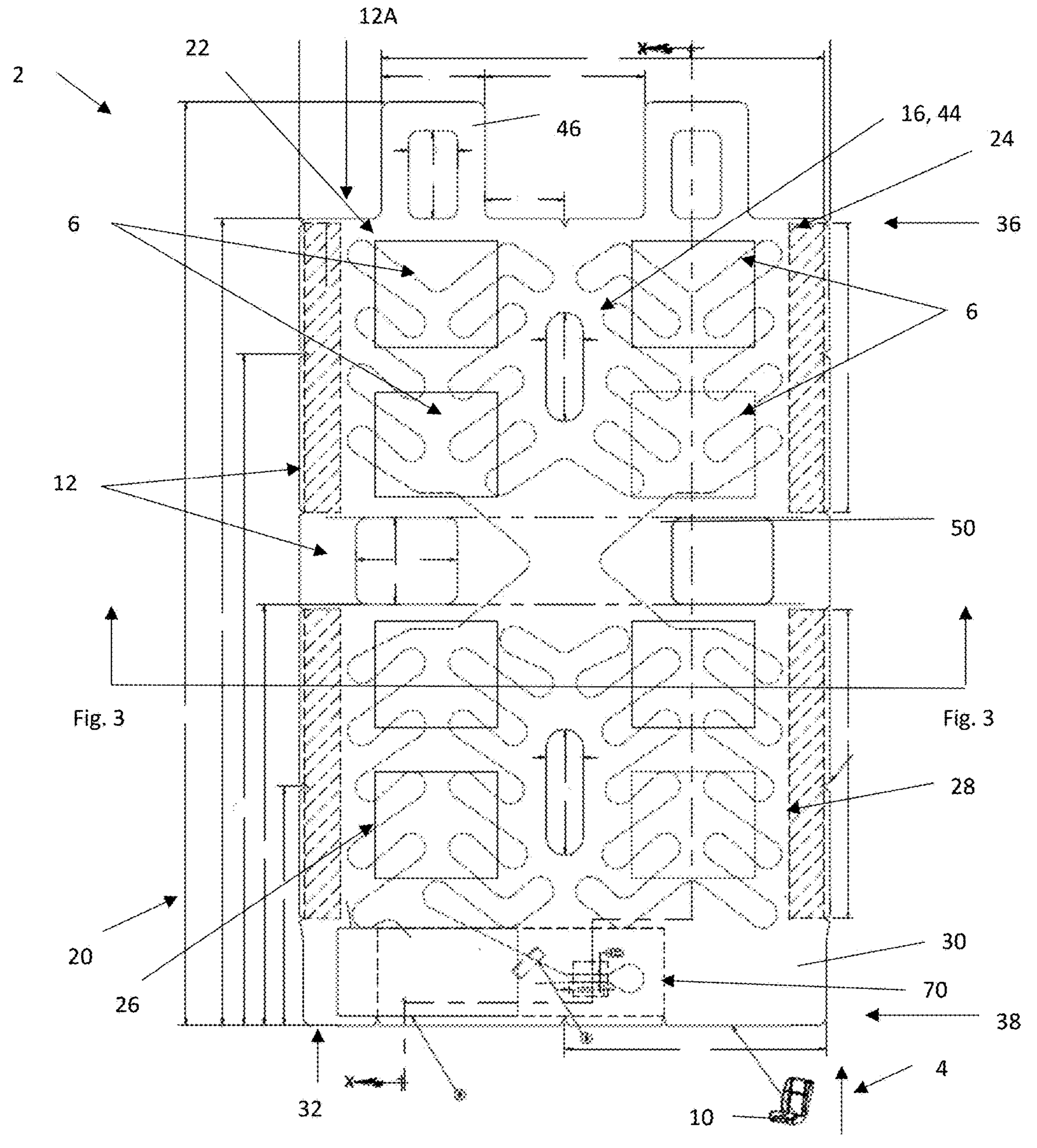
FIG. 1 is a plan view of a climate control system over a structure.

The explanations and illustrations presented herein are intended to acquaint others skilled in the art with the invention, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings are predicated upon providing an improved heater suitable for integration into a variety of articles of manufacture. For example, the heater may be integrated into or attached to structures of various articles of manufacture such as buildings, furniture, transportation vehicles, (e.g., boats, trains, airplanes, motorcycles, all terrain vehicles, busses, snowmobiles, or otherwise) or the like. Alternatively, the heater may be integrated into or attached to various components of transportation vehicles such as seats, benches, panels, footwells, floor mats, or other components that an occupant contacts. The heater of the present teachings may be located anywhere throughout a vehicle, and most advantageously, with components that generally come in contact with an occupant of the vehicle including arm rest, user control interfaces, seats, steering wheels, or otherwise. The heater may be employed for other heating applications external of a vehicle (e.g., bedding, chairs, or massagers).

The heater is particularly suitable for integration into a seat of an automotive vehicle. More particularly, the heater is suitable for integration with the seat portion with or without bolsters, back portion with or without bolsters, head rest portion, or a combination thereof. The heater may be located between two layers of the seat. The heater may be located under a fabric layer (e.g. cloth, leather, synthetic leather, or the like) and on top of a cushion or backrest (e.g. a foam support for the user). In one aspect, the present teaching employs a structure that makes it particularly suited for use beneath a perforated leather seat cover or perforated synthetic leather seat cover. The heater may be directly connected to a seat cushion. The heater may be indirectly connected to a seat cushion. The heater may be free of a connection with a movable member. The heater may indirectly connect to the seat cushion by a layer that extends between the cushion and the heater. The heater may be connected to a seat cushion with one or more intervening layers located between the cushion and the heater. The heater may be connected to one or more substrates and the one or more substrates may be connected to a cushion. The heater may be located over one or more lumbar supports, air inflated lumbar supports, one or more mechanical lumbar supports, or a combination thereof. The present heater, is flexible and may move with and/or accommodate movement of one or more parts of the structure, one or more parts integrated into the structure, or a combination thereof. The heater may be flexible to move with a lumbar support as the lumbar support expands and contracts. In this manner, the present heaters are particularly attractive for use in combination with a conditioned seat (e.g. a ventilated, actively cooled (such as by use of a thermoelectric device or module), or actively heated seat).

A conditioned seat may include one or more air movers. The one or more air movers may move air through one or more inserts that are located within or overlay the backrest cushion, seat cushion, or both. The one or more inserts may distribute the air from the air mover. The one or more air movers may include a Thermoelectric Device (TED). The TED may heat air as it enters the air mover or as it leaves the air mover. The TED may cool air as it enters the air mover or as it leaves the air mover. The air may be blown through the insert, the heater, the perforations in the seat cover (e.g. trim layer), or a combination thereof. One example of an air permeable seat and heating device is U.S. Pat. No. 6,064,037 incorporated by reference herein. The TED may blow hot air while the heater contemporaneously heats the seat; thereby, providing both conduction heating and convection heating. The heater may heat without the TED blowing heat and vice versa. A ventilated seat may include one or more air movers. The heater described herein may be placed so that a fluid may be moved over the heater and warm the fluid. The warmed fluid may travel within the trim bag and subsequently towards the occupant to provide comfort and/or heat. The trim bag may include one or more baffles so that a fluid passes back and forth through and/or over the heater. The heater may be centrally placed (i.e. is a center layer that fluid has to pass through and/or around) in the trim bag so that the heater acts as a baffle. Preferably, the heater includes one or more through holes so that fluid may pass through the heater and into contact with an occupant. The heater may be used as a diffuser to distribute the fluid to a occupant. The heater may be used in conjunction with a spacer layer (e.g., bag that distributes a fluid). The heater may have predetermined through holes that allows air to be guided to predetermined locations. Through holes in the heater may align with through holes in the cushion.

The heater as discussed herein may be used with any vehicle seat. Some vehicles may employ one or more recessed areas (also referred to herein as trenches or trench areas) between adjoining portions of a cushioning material, such as a polymeric foam bun or an area between two or more foam buns. The cushions may be free of trenches. Preferably, the heater may be used with a seat that includes one or more trench areas. The one or more trench areas may be longitudinally extending (e.g., along a length of a heater or away from an occupant), laterally extending (e.g., along a width of the heater or under the occupant), or both. More preferably, the heaters described herein may have a portion that is designed to be placed in the trench area of a cushion so that the heater may be secured in place and performance is not sacrificed. The one or more heaters may extend over the trench. The one or more heaters may be free of any portion extending into the trench. The one or more trenches may be free of any adhesive or any part of the heaters extending into the trench. Preferably, the heater and adhesive connect to a side wall of the trench. The sidewall of the trench is a vertical wall of the trench. The sidewall of the trench may face away form an occupant. The sidewall of the trench may extend at an angle relative to an occupant support (e.g., about a 90 degree angle). The trench may include two sidewalls that are connected via a bottom. The bottom may be substantially parallel to the occupant support surface. The heater may, however, be used without entering a trench area (i.e. may fit an area of the seat so that it does not enter a trench area).

The heater includes at least a pair of longitudinal edges (e.g., a first longitudinal edge and second longitudinal edge) and at least a pair of lateral edges (e.g., a first lateral edge and/or a second lateral edge). The longitudinal edges may be generally parallel to each other. The lateral edges may be generally parallel to each other. The heater may include a plurality of zones. The plurality of zones may each include one or more movable members, two or more movable members, three or more movable members, or four or more movable members. Preferably, the heater is divided into four zones. The four zones may be separated by trenches, through holes, slits, recesses, tabs, or a combination thereof. The longitudinal edges, zones, or a combination thereof may include a substrate, heating elements, or both connected together.

The substrate may function to carry the heating elements. The substrate may be a flexible substrate. The substrate may be elastic. The substrate may be elastically deformable. The substrate may be plastically deformable. The substrate may be wrinkle free. The substrate may be complementary in shape to the cushion, the movable member, or both. The substrate may include spandex, rubber, an elastomer, be woven, non-woven, extruded, a solid material, a porous sheet, woven, non-woven, polyester, or a combination thereof. The substrate may be a flexible substrate. The substrate may be stretchable. The substrate may stretch about 1 mm or more, about 2 mm or more, about 3 mm or more, or about 5 mm or more. The substrate may stretch about 5 cm or less, about 3 cm or less, or about 1 cm or less. The substrate may be sufficiently stretchable so that the flexible substrate moves with the movable member without restricting the movable member from making a predetermined movement. The material characteristics of the substrate may make the substrate flexible. The substrate may include one or more features that introduce flexibility into an otherwise non-flexible substrate. The substrate may include features that introduce flexibility into the substrate and the substrate may be flexible. The features may be one or more slits.

The slits may function to introduce flexibility into the substrate. The slits may be a perforation. The slits may be a cut in the substrate. The slits may remove material form the substrate. The slits may be free of material being removed. The slits may separate upon movement of the movable member. The slit may impart flexibility into the substrate so that the substrate and heater element are movable with the movable member. The slits may expand, separate, move outward, flex, or a combination thereof. The slits may permit one or more lumbar supports to expand and contract without impediment from the heater wires. The one or more slits may be in a longitudinal direction, a lateral direction, or both. Edges of the slits may move away from each other during movement of the movable member. The slits may be used in conjunction with through holes.

The through holes may function to permit fluid to flow through the substrate. The through holes may align with through holes in the cushion. The through holes may permit fluid to flow into contact with an occupant. Through holes may extend through the heater, the cushion, or both. The through hole may allow fluid from one or more blowers to be in fluid communication with an occupant on a seat of a cushion. The through holes may be interspersed between the heating elements.

The one or more heating elements may function to provide heat to an occupant. The one or more heating elements may be connected to the flexible substrate. The one or more heating elements may produce heat upon an application of power. The one or more heating elements may include an insulator that surrounds a metallic portion of the heating elements. The one or more heating elements may be a wire. The one or more heating elements may be connected to the substrate by one more sewing threads. The one or more heating elements may be connected to one or more power wires, one or more temperature sensors, or both.

The one or more power wires may function to provide power, controls, or both. The one or more power wires may provide power to the heating elements so that the heating elements produce heat. The one or more power wires may provide a signal to a temperature sensor. The one or more power wires may turn on and off the heating elements depending upon a measured signal by a temperature sensor. The temperature sensor may be a PTC, NTC, thermistor, or a combination thereof. The one or more power wires, thermistor, or both may be partially or entirely covered by one or more patches.

The one or more patches may be a part of the support that extends over a tops side of the temperature sensor, the power wires, or both. The one or more patches may protect the temperature sensor, the power wires, or both. The one or more patches may cover a connection between the power wires, the temperature sensor, the heating elements, or a combination thereof.

The one or more heating elements may function to provide heat and to move with the movable members, the flexible substrate, or both. The one or more heating elements may include one or more legs, two or more legs, three or more legs, four or more legs, one or more connection legs, or a combination thereof. The one or more first legs may extend along a first side of the movable members, the recesses, the substrate, or a combination thereof. The one or more second legs may extend along a second side of the movable members, the recesses, the substrate, or a combination thereof. If a third leg is present then the third leg may be located on a second side of the substrate and then on a first side and second side of the movable members, the recesses, the substrate, or a combination thereof. The flexible substrate may have a region between the first leg and the second leg that is movable. The heating elements may not prevent movement of the flexible substrate. The heating elements may move with the flexible substrate so that the flexible substrate moves as the movable member moves. The first leg and second leg may be connected by a connection leg. The connection leg may allow the heating element to be a continuous wire. The one or more connection legs may extend over the movable member, around the movable member, proximate to the movable member, or a combination thereof. The one or more legs may be undulating, serpentine, zig-zag, include fingers, have an interdigitated shape, or a combination thereof. The one or more first legs and second legs may remain on opposite sides of a center line relative to the movable member, the recess, or both. The first leg and the second leg may extend from an area outside of the movable member, towards each other and stop before reaching each other, and then extend away from each other. The first leg, the second leg, or both may be generally U shaped and extend towards a center line between the first leg and the second leg. The first leg, the second leg, or both may be free of crossing a centerline, a center of a movable member, or both. The one or more legs may be movable relative to each other. The substrate may be free of adhesive around the legs.

The adhesive may be located only in the trenches. The adhesive may function to allow the substrate to flex with the movable members. The adhesive may be located on a sidewall of the trench. The adhesive may be free of contact with a support surface. The adhesive may be free of contact with a surface that faces the occupant. The adhesive may be free of contact with the recess, the movable member, extending over the movable member, extending over the recess, or a combination thereof. The adhesive may include elastomeric characteristics and may flex as the substrate flexes. The adhesive may be connected to a cushion surface. The adhesive may be free of being located within the trenches. The adhesive may not extend over the movable member. The adhesive may be free of contact with all regions except within the trenches. The adhesive may be located in zone 1, zone 2, zone 3, zone 4, or a combination thereof of the heater. The adhesive may be located along one or more longitudinal edges, one or more lateral edges, or both. The adhesive may be located in one or more edge regions. The adhesive may extend on a first side of a trench and a second side of a trench. The adhesive may be located in an edge region. The adhesive may be a liquid, a solid, a semi-solid, or a combination thereof. The adhesive may be tacky at room temperature. The adhesive may be located on a carrier. The adhesive may be covered by a non-stick layer. The adhesive may be two sided. The adhesive may be a peel and stick adhesive. The adhesive may be curable. The adhesive may be free of curing. The adhesive may stick to one or more different materials. The adhesive may stick to a polyester, foam, film, a woven material, a non-woven material, or a combination thereof. The one or more flexible substrates may move with the one or more cushions, one or more movable members, or both.

The one or more movable members may function to move independent of the occupant. The one or more movable members may move in a circular manner, in a direction perpendicular to cushion surface, longitudinally, laterally, toward an occupant, or a combination thereof. The movable members may include one or more spherical members that may be moved into contact with an occupant to massage an occupant. The one or more movable members may be a pneumatic cushion, massage device, mechanical lumbar support, inflatable lumbar support, or a combination thereof. Preferably, the movable member is about two or more, about four or more, about six or more, or about eight or more movable members. The movable members may sit behind the cushion, within the cushion, over the cushion, or a combination thereof so that movement of the movable member moves the heater, the trim cover, or both. The movable members may move so that a force is exerted upon the occupant. The one or more movable members may be located in a backrest, bun, armrest, bolster, or a combination thereof. The one or more movable members may be located within a recess within a cushion so that the movable members may not be felt by an occupant when the movable member is on an off position.

The one or more cushions may function to support an occupant, the heater, movable members, or a combination thereof. The one or more cushions may include one or more recesses that receive the one or more movable members that a top of the one or more movable members are coplanar with a surface of the cushion (i.e., cushion surface). The one or more recesses may extend partially through the cushion. The one or more recesses may support the one or more movable members and the heater. The one or more recesses may allow the heater to extend over the movable members when the movable members are not activated so that the heater is substantially planar. The one or more cushions may include a cushion surface that supports an occupant. The one or more cushions may include one or more through holes. The one or more cushions may be connected to or include a climate controlled system. The climate controlled system may include a heater, ventilation, active heating, active cooling, or a combination thereof. One or more cushions of the seat may include ventilation, active cooling, active heating, or a combination thereof. The seat may include one or more air movers (i.e. blower) in fluid connection to the one or cushions so that air may be blown onto the user or so that air may be pulled away from the user.

The one or more air movers may include a heating device, a cooling device, or both (i.e. a thermoelectric device (TED)). The TED may be used to heat air and/or cool air that is blown onto the user. The air mover and TED may be placed in the seat in many different configurations. For example, the TED and/or air mover may be used in any manner described in any of U.S. Pat. Nos. RE38,128; 4,923,248; 5,626,021; 6,164,719; 6,439,658; 6,619,736; 6,629,724; 6,676,207; 6,840,576; 6,857,697; 6,869,139; 6,869,140; 6,976,734; 7,040,710; 7,083,227; 7,100,978; 7,213,876; 7,301,441; 7,338,117; 7,356,912; 7,475,938; 7,506,938; 7,510,239; 7,587,901; 7,618,089; and 7,637,569 or U.S. Patent Application Publication No. 2009-0218855. The heater may be positioned on the one or more cushions so that the heater does not restrict fluid movement from the blower. The TED and heater may both produce heat at the same time; however, the TED or heater may be used separately. The heater may be used to produce heat in an active heating system in place of a TED. The heater, preferably, may not be used when the TED is used to cool the user. The air mover and TED may be used in conjunction with an insert disclosed herein so that air may be directed evenly and consistently to the user.

The seat heater may be used in conjunction with an occupant sensor. An occupant sensor may be used on any seat in conjunction with a heater. Preferably, an occupant senor may only be used on passenger seats. The heater may include one or more locators or tabs (hereinafter locators) so that the heater and/or the occupant sensor are aligned on the seat. The locators may be of any shape, size, quantity, or a combination thereof so that the heater and/or the occupant sensor are aligned. There may be 2, 3, 4, 5, or even 6 locators on a heater. Preferably, the locators may be located on the edges of the heater. The heater may be placed under the occupant sensor, in the cushion, under the cushion, or a combination thereof. Preferably, the heater is located over the occupant sensor. The locators may be in the form of printed markings on the occupant sensor and matching markings on the heater. Preferably, the locator is a hole or cut-out in the occupant sensor and/or heater that matches the holes or cut-outs in the heater. The locators may be used for assembling the occupant sensor, heater, or both properly in an article of manufacture (i.e. a seat).

The heater may be used in conjunction with a seat that includes ventilation, active cooling, active heating, or a combination thereof. The heater may be used with a ventilated, active cooling, active heating, or a combination thereof seat that uses a bag configuration to distribute heat and/or cool air. One example of a bag is illustrated in U.S. Pat. No. 6,869,140, incorporated by reference. The heater may be placed above the bag. The heater may be placed below the bag. The heater may be placed in the bag. The heater may be used to heat the fluid as it passes from the blower on the way to the occupant. The heater may form a portion of the bag (i.e. the heater may be attached so that it forms the top surface of the bag). The bag may include a top surface, a bottom surface, and one or more connecting walls. The heater may be attached to the bag by welding, gluing, taping, adhering, or the like. Preferably the heater is ultrasonically welded to the one or more connecting walls so that a bag is formed. The ultrasonic techniques discussed herein may be used to ultrasonically weld the heater to the other surfaces thereby forming a bag. Preferably, the heater and the other surfaces are made of a similar material (i.e. a plastic material). The bag may include at least three layers. The at least three layers may include a bottom layer, a three dimensional spacer, and a upper layer. The top and bottom layer may be ultrasonically welded together along the perimeters, with the spacer in between them. The top layer may contain holes or cutouts for air circulation. The bag may be attached to the air mover. The heater may be placed in the bag with the spacer. The heater may be placed in the bag without adding a spacer. The heater may perform the same functions as the spacer.

The heater may regulate using pulse width modulation (PWM) in combination with the self-regulation characteristics of the positive temperature coefficient material. Accordingly, the PWM may be set so that the heater receives various power settings to warm up at various temperatures.

The heater may include a controller and a system harness. The controller may receive input signals from the user. For example, when a user changes the temperature setting from high to low the controller receives the signal. The controller may send output power to the heater. For example, once the controller receives the input signal from the user the controller may send the required duty cycle to the heater so that the heater becomes warmer or cooler. The system harness may further receive the power from the power source so that the system harness may send power to the heater. The system harness may include the controller. It is contemplated that the controller may calculate the duty cycle required to control the heater and then send the calculated duty cycle to the heater. Preferably, the system harness will look up the required duty cycle and send the known duty cycle to the heater.

FIG. 1 illustrates a structure 2. The structure 2 is a seat 4 with a movable member 6. The seat 2 includes a cushion 10 with a trench (not shown) and recesses (not shown). The recesses are spread apart and form a first zone 22 and a second zone 24 that are separated from a third zone 26 and fourth zone 28 by a trench 12. A trench 12 is also located along the sides of the heater 30 where the trenches 30 are located proximate to the first longitudinal edge 32 and second longitudinal edge 34. The first longitudinal edge 32 and second longitudinal edge 34 are connected by a first lateral edge 36 and a second lateral edge 38. Adhesive 60 connects the first longitudinal edge 32 and the second longitudinal edge 34 to a sidewall (not shown) of a trench (not shown) respectively. The heater 30 and cushion 10 each include a through hole 16 and 44 respectively, where air can be introduced into a portion of the climate controlled system, which is not shown. The heater 30 includes a heating element 50 and tabs 46 located along the first lateral edge 36. A thermistor 70 is located proximate to the second lateral edge 38.

Figure 2:
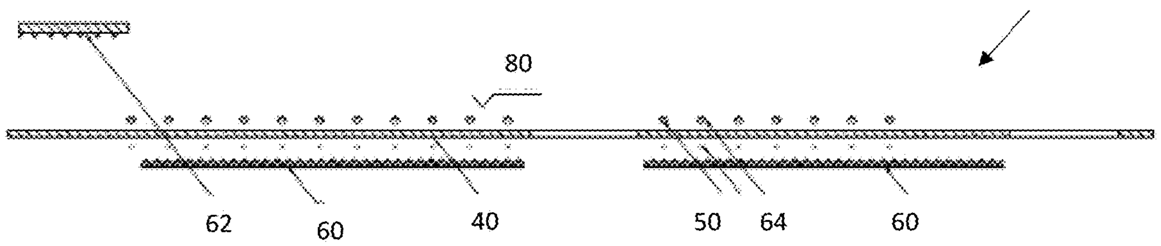
FIG. 2 is a cross-sectional view of FIG. 1 along line X-X.

FIG. 2 is a cross-sectional view along line X-X so that the layers are shown. A patch 62 extends above a portion of the heating elements 50 and flexible substrate 40. The heating elements 50 are connected to the flexible substrate 40 by sewing 64 that extends above and below the flexible substrate 40. Adhesive 60 extends below the flexible substrate 40 for covering the sewing 64. A trim cover 80 covers a portion of the heater 30 where power enters the heater 30.

Figure 3:
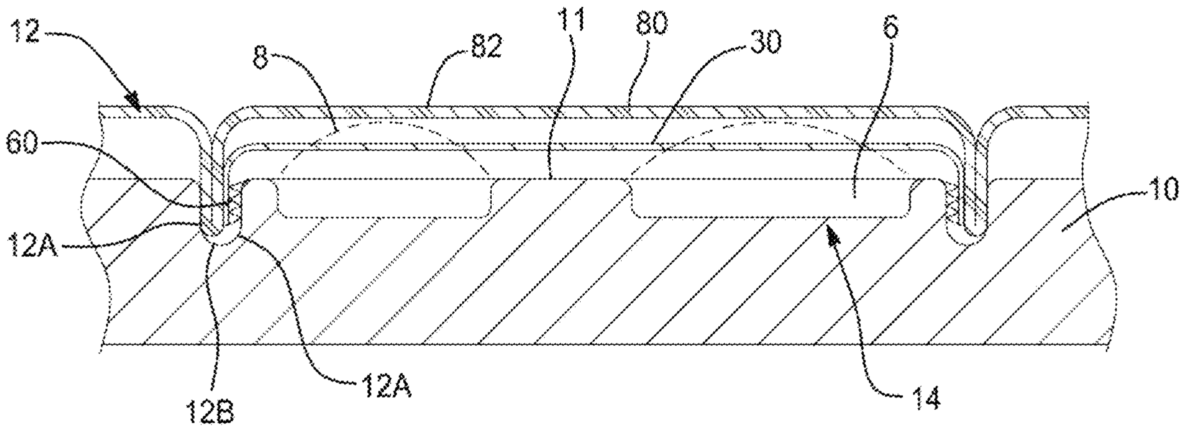
FIG. 3 is a cross-sectional view of FIG. 1 along lines 3-3.

FIG. 3 illustrates a cross-sectional view of a cushion 10 with a heater 30 extending over the cushion 10 (e.g., bun or backrest). The cushion 10 includes a trench 12 with a pair of opposing sidewalls 12A and a bottom 12B connecting the opposing sidewalls 12A. An adhesive 60 is connected to a sidewall 12A of the trench 12 on opposing sides of the cushion 10. The cushion 10 includes recesses 14 with movable members 6. The movable members 6 are expandable or movable 8. The heater 30 extends over and lays on a cushion surface 11 of the cushion 30, and a trim cover 80 extends over the heater 30 to form a support surface 82.

Figure 4A:
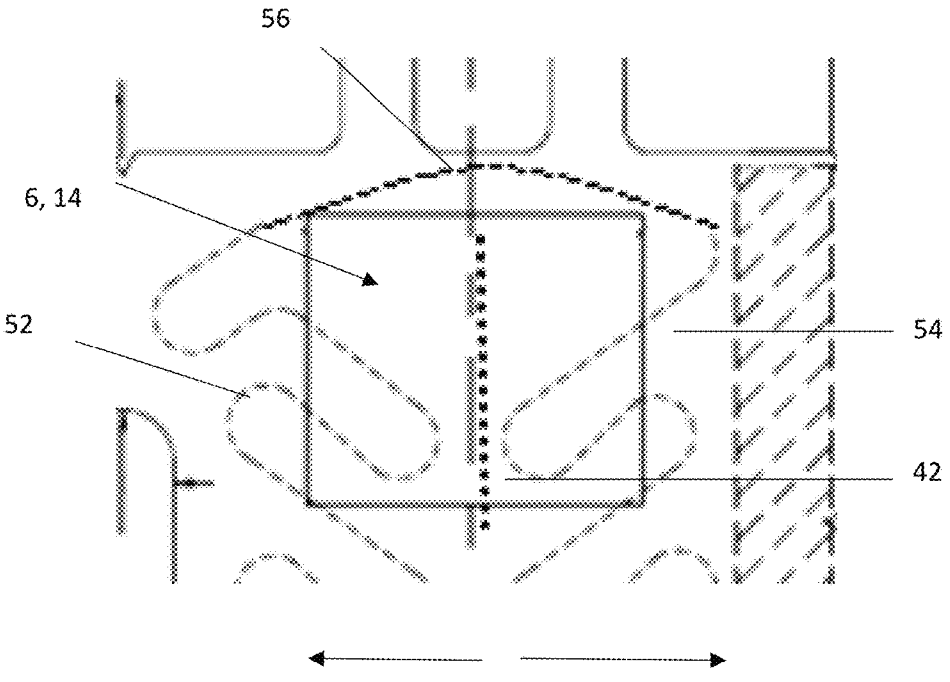
FIG. 4A is a close up view of a recess and heating elements.
Figure 4:
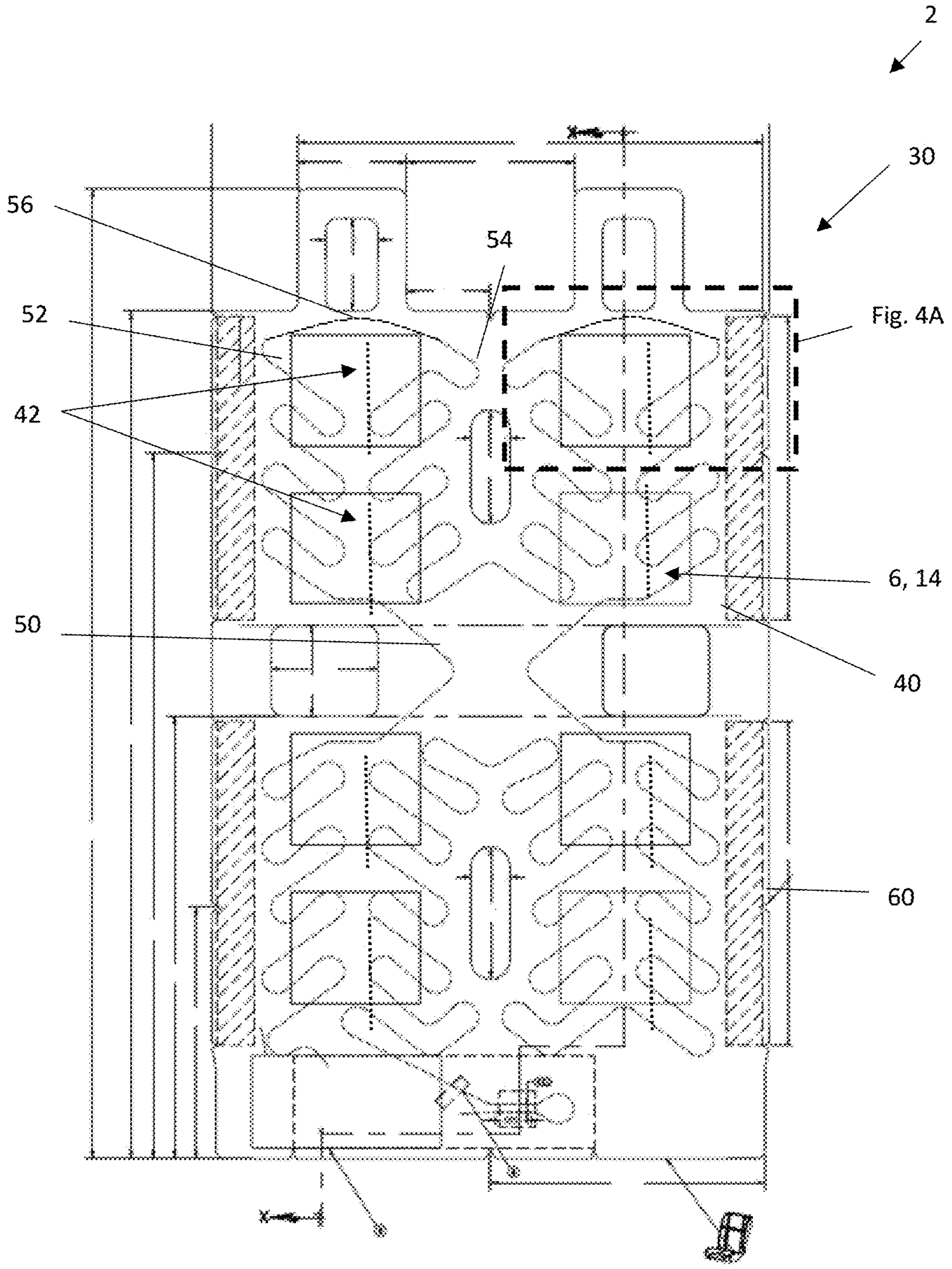
FIG. 4 is a plan view of a climate control system over a structure.

FIG. 4 illustrates a structure 2 including a heater 30. The heater 30 extends over the movable members 6 that are located within recesses 14. The heater 30 includes a flexible substrate 40 connected to adhesive 60 on opposing sides and a heating element 50 connected to the flexible substrate 40. The flexible substrate 40 includes slits 42 that extend over the movable member 6 so that the slit can open to accommodate movement of the movable member 6. The heating element 50 includes a first leg 52 that extends along and over a first side of the recess 14 and movable member 6, a second leg 54 that extends along and over a second side of the recess 14 and movable member 6 and a connection leg 56 that connects to the first leg 52 and the second leg 54 and extends along a third side of the recess 14 and movable member 6.

FIG. 4A illustrates a close-up view of the movable member 6 in the recess 14 with the first leg 52, second leg, 54, and connection leg 56. The slit 42 extends between the first leg 52 and second leg 54 so that the first leg 52 and second leg 54 are movable relative to each other in the direction of the arrows.

Figure 5:
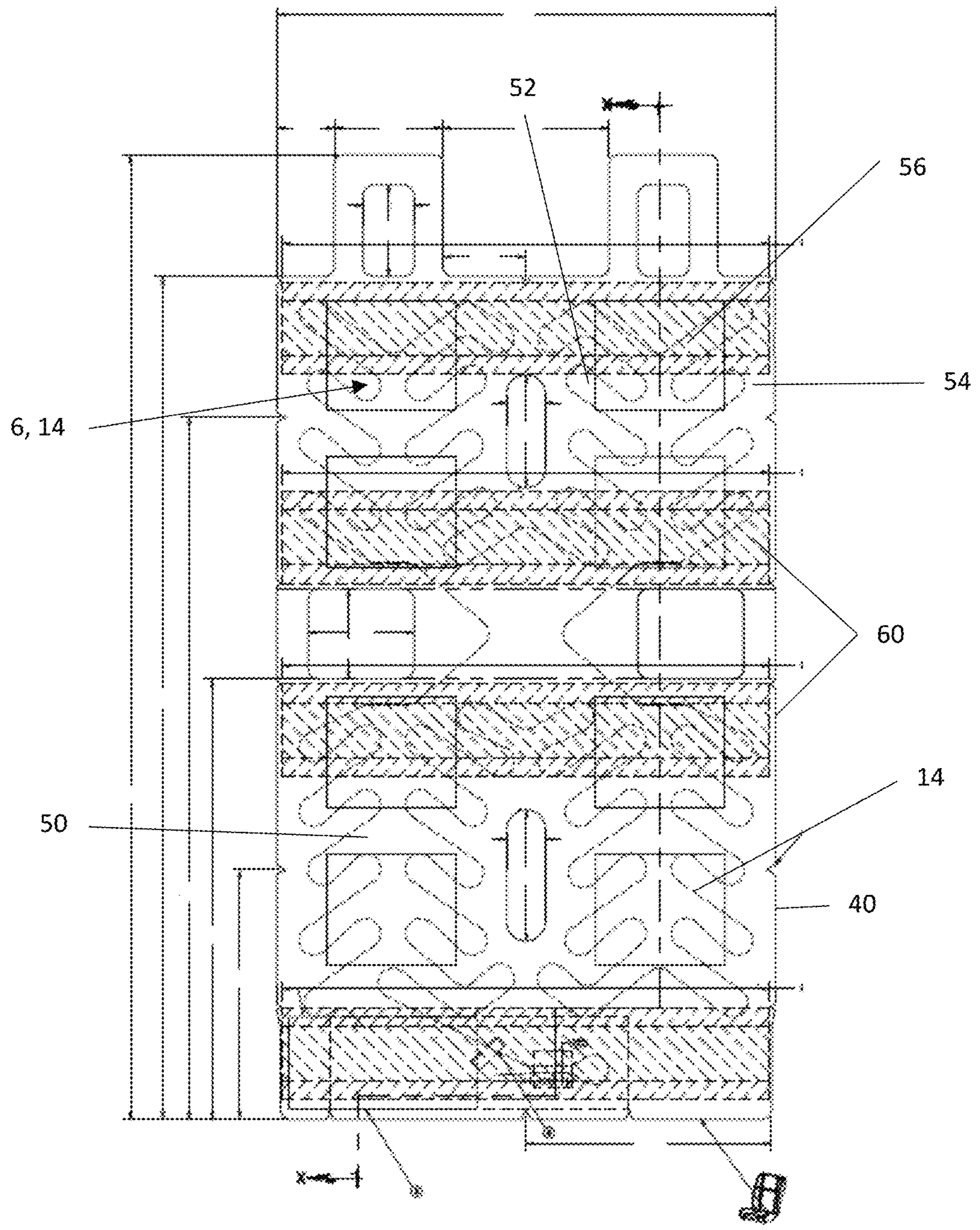
FIG. 5 is a plan view of a climate control system over a structure.

FIG. 5 illustrates adhesive 60 extending over a portion of the movable member 6 and recess 14. The first leg 52, second leg 54, and connection leg 56 of the heating element 50 are partially covered by the adhesive 60 and each extends at least partially over the movable member 6 and recess 14 with a space located between the first leg 52 and second leg 54 so that movement (e.g., stretching) of the flexible substrate 40 moves the first leg 52 and second leg 54 apart.

Figure 6:
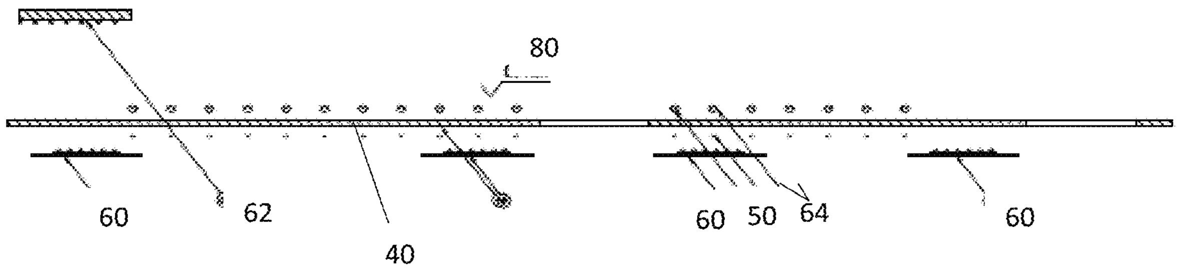
FIG. 6 is a cross-sectional view of FIG. 5 along line X-X.

FIG. 6 is a cross-sectional view along line X-X so that the layers are shown. A patch 62 extends above a portion of the heating elements 50 and flexible substrate 40. The heating elements 50 are connected to the flexible substrate 40 by sewing 64 that extends above and below the flexible substrate 40. Adhesive 60 extends below the flexible substrate 40 for covering the sewing 64. A trim cover 80 covers a portion of the heater 30 where power enters the heater 30.

Figure 7:
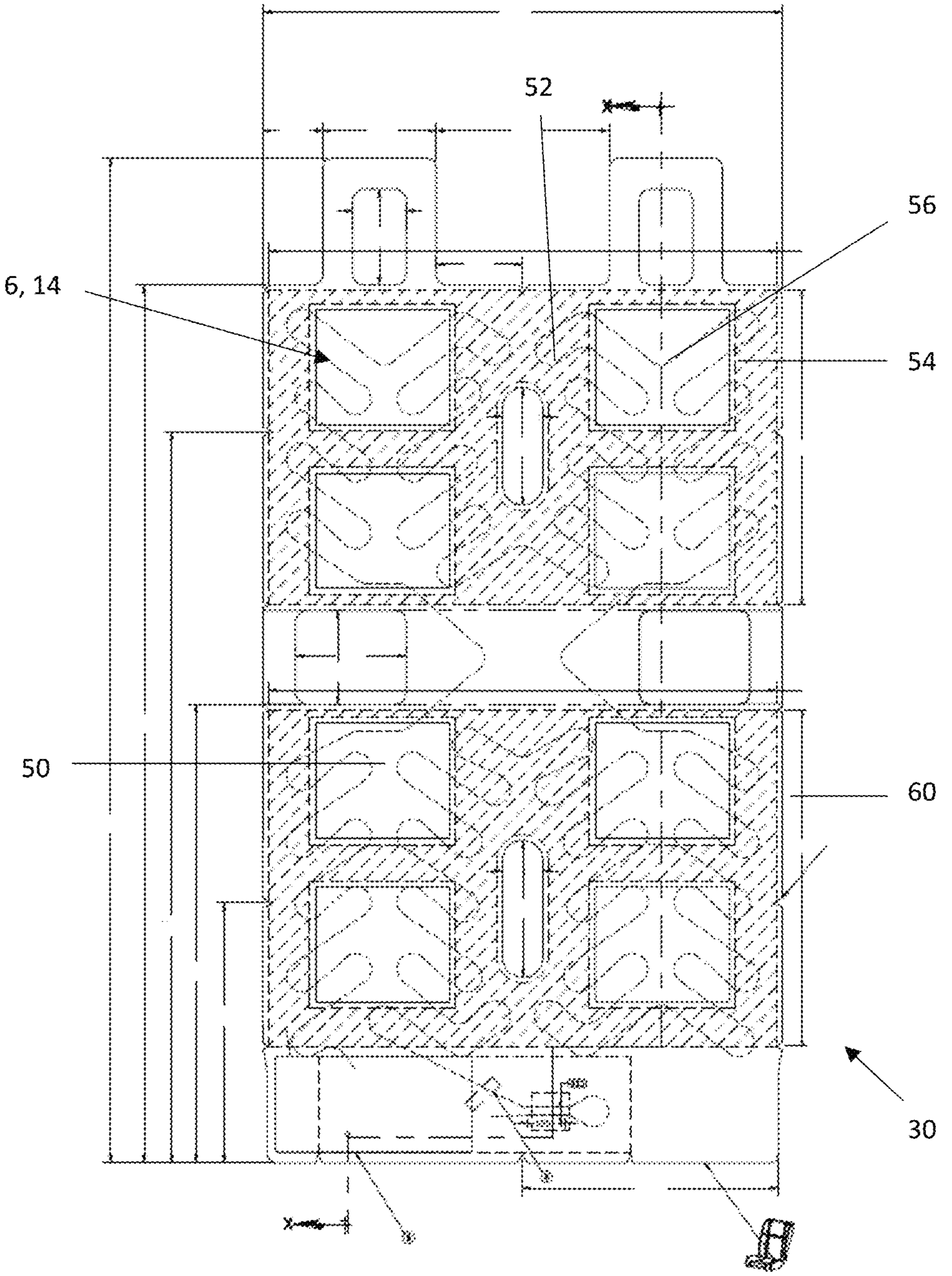
FIG. 7 is a plan view of a climate control system over a structure.

FIG. 7 illustrates adhesive 60 having windows in the regions over the movable member 6 sitting in the recess 14. The heating element 50 does not cross over the movable member 6 and includes a first leg 52, second leg 54, and connection leg 56 that connects the first leg 52 and the second leg 54 so that as the movable member 6 moves, the heater 30 is not restricted by the heating element 50 and moves with the movable member 6.

Figure 8A:
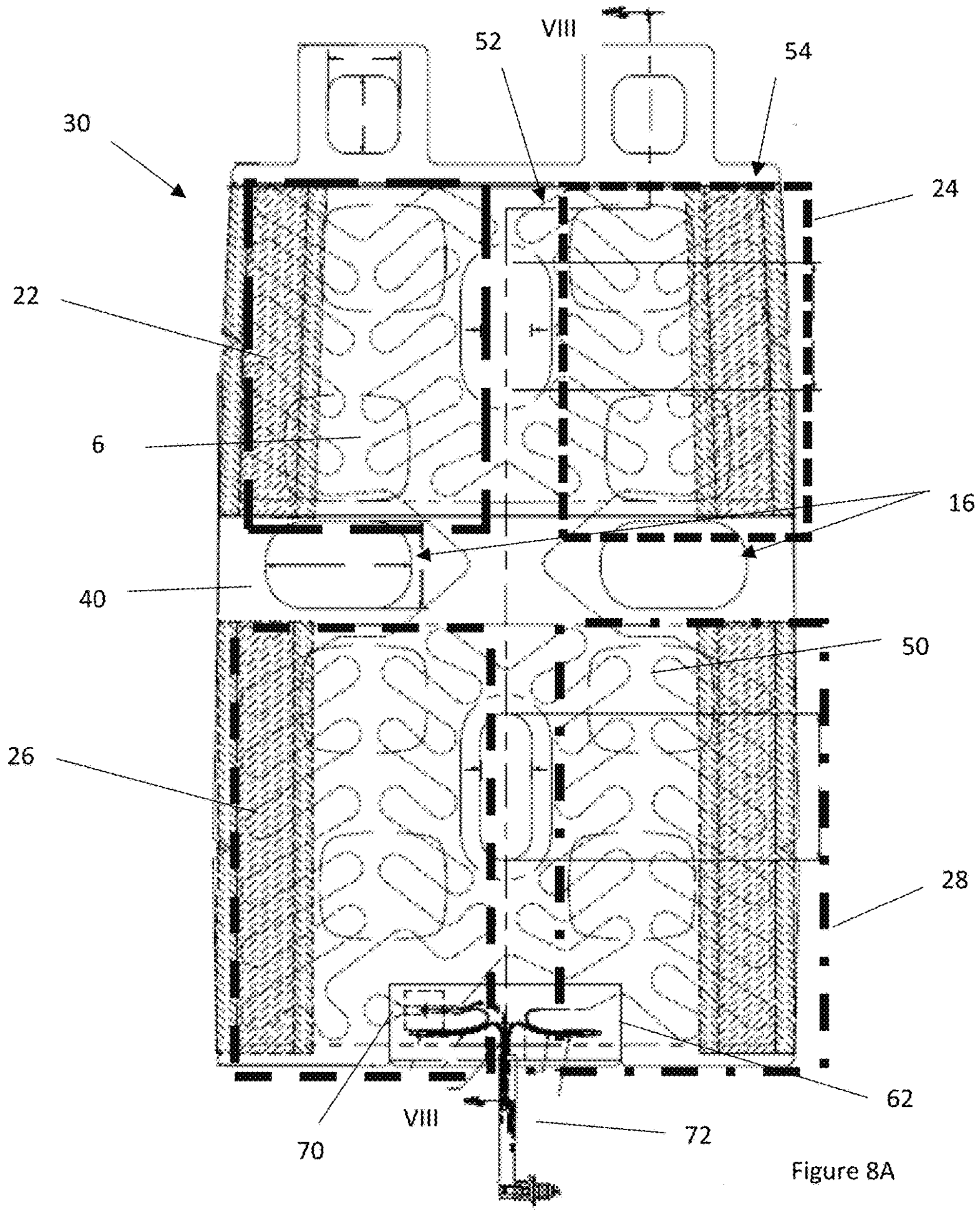
FIG. 8A is a plan view of a heater.

FIG. 8A is a top plan view of a heater 30. The heater 30 is divided into four zones (zone one 22, zone two 24, zone three 26, and zone four 28) and one or more movable members 6 are located in each of the zones. The heater 30 includes a heating element 50 connected to a flexible substrate 40. The heating element 50 is divided into a first leg 52 and a second leg 54. The flexible substrate 40 includes through holes 16 and the flexible substrate 40 extends over movable members. The heating element 50 is connected to a power wire 72 and thermistor 70 and the thermistor 70 is partially covered by a patch 62.

Figure 8B:
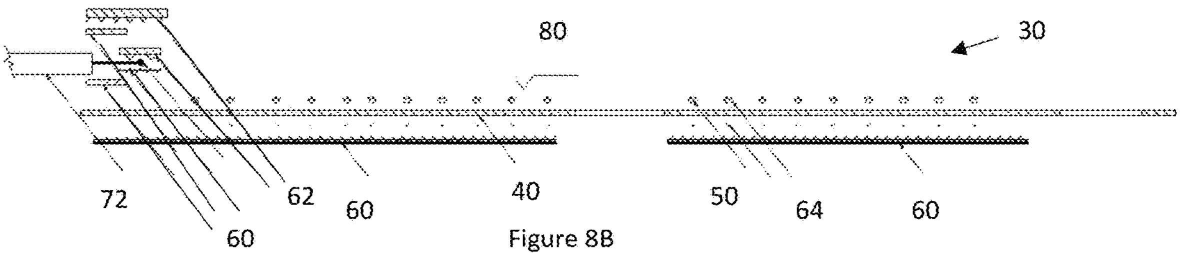
FIG. 8B is a cross-sectional view of FIG. 8A along line VIII-VIII.

FIG. 8B is a cross-sectional view of the heater 30 along line VIII-VIII. The heater includes a flexible substrate 40 and a heating element 50 that is connected to the flexible substrate 40 by sewing 64 that extends above and below the flexible substrate 40. A patch 62 extends over wires extending from a power wire 72 and is connected to the flexible substrate 40 by adhesive 60 in an edge region of the heater 30.

Figure 9:
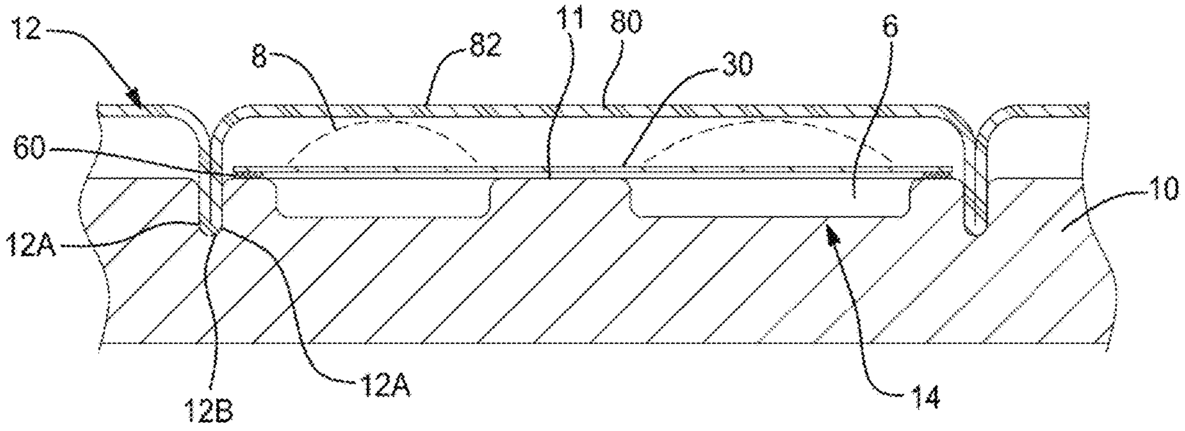
FIG. 9 is a cross-sectional view of a heater connected to a seat.

FIG. 9 illustrates the heater 30 located between a cushion 10 and a trim cover 80. The heater 30 is connected by an adhesive 60 to the cushion surface 11 proximate to trenches 12. The heater 30 extends over movable members 6 that are located within a recess 14. The movable members 6 are illustrated as moving to a shape 8 where the heater 30 is moved away from the cushion surface 11.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of or consist of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the teaching should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

2 Structure
4 Seat
6 Movable member
8 Movement of movable member
10 Cushion
11 cushion surface
12 Trench
12A Sidewall
12B Bottom
14 Recess
16 Through hole
20 Climate controlled system
22 Zone1
24 Zone 2
26 Zone 3
28 Zone 4
30 Heater
32 First longitudinal edge
34 Second longitudinal edge
36 First lateral edge
38 Second lateral edge
40 Flexible substrate
42 Slit
44 Through hole
46 Tab
50 Heating element
52 First leg
54 Second leg
56 Connection leg
60 adhesive
62 Patch
64 sewing
70 Thermistor
80 Trim cover
82 Support surface

I claim:

1. A system for a vehicle seat comprising:
a movable member disposed in a recess of a cushion and configured to be moved to apply a force on an occupant in the vehicle seat, wherein the movable member comprises a pneumatic cushion, an inflatable cushion, a massage device, a mechanical device, a lumbar device, or a combination thereof; and
a heater at least partially overlaying the cushion and the movable member, the heater including:
a flexible substrate, and
a heating element;
wherein the heating element comprises a first leg extending at or along a first side of the movable member, a second leg extending at or along a second side of the movable member, and a connection leg extending between and connecting the first leg and the second leg.

2. The system of claim 1,
wherein the first leg and the second leg each extend from an area outside the movable member towards a center of the movable member.

3. The system of claim 2, wherein the heating element is a wire.

4. The system of claim 2, wherein the first leg and the second leg are each free from crossing the center of the movable member.

5. The system of claim 1, wherein the flexible substrate is perforated and includes a slit so that the flexible substrate is movable at the slit.

6. The system of claim 1, wherein a portion of the connection leg extends over the movable member.

7. The system of claim 2, wherein the first leg, the second leg, the connection leg, or a combination thereof has a serpentine shape.

8. The system of claim 1, wherein the heater is free of an adhesive at a location over the movable member.

9. The system of claim 1, wherein the heater extends into a trench of the cushion.

10. The system of claim 1, wherein the heater is connected to a surface of the cushion.

11. The system of claim 1, wherein the flexible substrate stretches during movement of the movable member and the heating element moves with the flexible substrate.

12. The system of claim 1, wherein the flexible substrate includes a region without the heating element between the first leg and the second leg and the region stretches with the movable member.

13. The system of claim 1, wherein the vehicle seat comprises a trim cover, the heater is disposed between the cushion and the trim cover, and the flexible substrate of the heater stretches or moves as the movable member is moved.

14. The system of claim 1, wherein the system includes an adhesive that directly or indirectly connects the heater to the cushion.

15. The system of claim 14, wherein the adhesive anchors the heater as the flexible substrate stretches or moves with the movable member as the movable member moves.

16. The system of claim 1, wherein the system comprises a ventilation device that includes a bag structure and an air mover configured to move air through the bag structure.

17. The system of claim 16, wherein the movable member is located above, below, or within the bag structure.

18. The system of claim 1, wherein the movable member is behind the cushion or the movable member is in front of the cushion.

19. The system of claim 15, wherein the flexible substrate is perforated and includes a slit so that the flexible substrate is movable at the slit.

* * * * *